United States Patent [19]

Lasserre et al.

[11] Patent Number: 5,388,620
[45] Date of Patent: Feb. 14, 1995

[54] PACKAGING CONTAINER OF THE AEROSOL TYPE WHICH CAN BE RECHARGED WITH COMPRESSED GAS

[75] Inventors: Pierre Lasserre, Coubron; Nicole Konig, Villebon S/Yvette, both of France

[73] Assignee: L'Oreal, Paris, France

[21] Appl. No.: 123,071

[22] Filed: Sep. 20, 1993

[30] Foreign Application Priority Data

Sep. 28, 1992 [FR] France .................. 92 11535

[51] Int. Cl.$^6$ ............................................. B65B 31/00
[52] U.S. Cl. .................................... 141/20; 141/3; 141/113; 137/854
[58] Field of Search ................. 141/3, 20, 113; 137/854

[56] References Cited

U.S. PATENT DOCUMENTS

| | | | |
|---|---|---|---|
| 3,169,670 | 2/1965 | Hrebenak et al. | 141/3 X |
| 3,366,148 | 1/1968 | Mizuguchi | 141/3 |
| 3,601,164 | 8/1971 | Bruce | 141/20 |
| 3,626,978 | 12/1971 | Hoekstra | 137/854 |
| 3,633,613 | 1/1972 | Julow | 137/854 X |
| 3,661,174 | 5/1972 | Cripe . | |
| 4,084,606 | 4/1978 | Mittleman | 137/854 X |
| 4,328,843 | 5/1982 | Fujii | 141/20 X |
| 4,658,979 | 4/1987 | Mietz et al. | 141/3 |
| 4,683,916 | 8/1987 | Raines | 137/854 |
| 4,762,149 | 8/1988 | Pickl, Jr. . | |

FOREIGN PATENT DOCUMENTS

| | | |
|---|---|---|
| 0170007 | 4/1987 | European Pat. Off. . |
| 1228733 | 9/1960 | France .................. 141/20 |
| 2380075 | 2/1978 | France . |

Primary Examiner—Ernest G. Cusick
Attorney, Agent, or Firm—Oliff & Berridge

[57] ABSTRACT

A packaging container of the aerosol type, which can be recharged with compressed gas, comprising an outer casing capable of being connected with a filling adaptor provided at its outer end to a compressed gas source and connected on the inside to a filling tube whose free end opens inside the casing of the container above the level of the liquid contained in the latter.

It comprises, mounted at the free end of the filling tube (7), a sealing device (9) arranged in the form of a case (10, 14) comprising a chamber (19) delimited between a lower wall (11) and an upper wall (15), the chamber communicating with the internal volume of the casing through at least one orifice (16) made in the upper wall (15), and with the filling tube (7) by orifices (12) made in the lower wall (11) outside a central part of the latter, and, inside the chamber (19), an elastic diaphragm (20) immobilized in its central part against the central part of the lower wall (11).

8 Claims, 1 Drawing Sheet

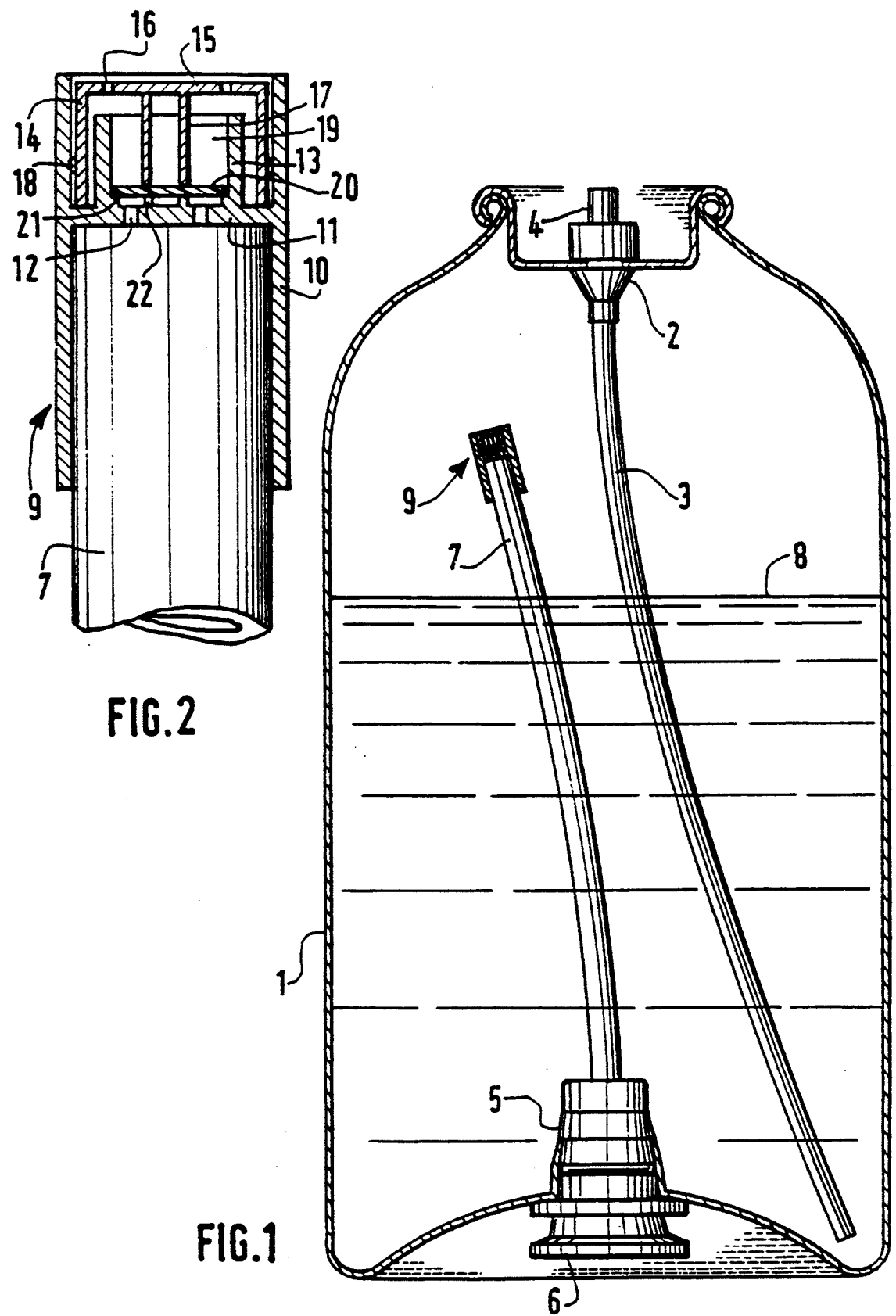

PACKAGING CONTAINER OF THE AEROSOL TYPE WHICH CAN BE RECHARGED WITH COMPRESSED GAS

BACKGROUND

The present invention relates to a packaging container of aerosol type, comprising an outer casing, which is generally cylindrical, suitable for containing a compressed gas, in particular compressed air, and a liquid intended to be expelled in the form of a spray or a foam through a dispensing nozzle by actuation of a dispensing valve mounted at the upper part of the casing and possibly connected to an immersed tube.

More precisely, the invention relates to such a packaging container, of the type which can be recharged with compressed gas, and comprising for this purpose, preferably in its end wall, a filling adaptor passing through the wall of the casing in a leaktight manner and provided at its outer end with means for connection to a compressed gas source, such as a compressor, and, at its inner end, with an orifice opening inside the container.

In order to make the container leaktight, provision has been made to fit an elastic diaphragm provided with peripheral holes onto the inner end of the adaptor. When compressed gas is admitted, the diaphragm lifts away from the end of the adaptor, in line with the orifice made therein, and the compressed gas enters the container through peripheral holes in the diaphragm.

When the compressed gas supply is stopped, the diaphragm is again applied onto the end of the adaptor, covering the orifice made therein.

In such an embodiment, the compressed gas is introduced into the container in the lower part of the latter containing the liquid, which leads to the formation of bubbles in the liquid and thus to the formation of a foam in the container.

Furthermore, the diaphragm made at the end of the adaptor is in contact with the liquid and is thus exposed to chemical attack which can have an effect on its qualities and therefore lead to sealing defect problems through the adaptor.

Another embodiment, known by FR-A-2,380,075, consists in making the adaptor in the form of a filling valve provided with spring non-return means and connected to a filling tube whose free end opens inside the casing of the container above the level of the liquid contained in the latter.

This solution makes it more complicated to produce the adaptor and to mount it on the casing, but without avoiding the sealing defect problems mentioned previously.

SUMMARY OF THE INVENTION

The present invention proposes production of a container of the aerosol type, which can be recharged with compressed gas, making it possible to avoid the drawbacks of the known embodiments by simple and economical means.

The container according to the invention is essentially characterized in that it comprises, mounted at the free end of the filling tube, connected to the adaptor a sealing device arranged in the form of a case, preferably a cylindrical case, comprising on the inside a chamber delimited between a lower wall and an upper wall, the chamber communicating with the internal volume of the casing through at least one orifice made in the upper wall, and with the filling tube by orifices made in the lower wall outside a central part of the latter and, inside the chamber, an elastic diaphragm immobilized in its central part against the central part of the lower wall.

When compressed gas is admitted with a view to recharging the container, the compressed gas coming through the filling tube passes through the orifices provided in the lower wall, which causes the peripheral part of the diaphragm to be lifted, and the compressed gas leaves the chamber through the orifice or orifices in the upper wall and enters the upper part of the container, that is to say a region which does not contain any liquid.

After the compressed gas supply is stopped, the diaphragm returns to its sealing position, closing the orifices of the lower wall and preventing any flow of liquid back through the filling tube.

Advantageously, there is provided on the lower wall an outer annular collar forming a seat for the peripheral part of the diaphragm and an inner annular collar forming a seat for the central part of the diaphragm, the diaphragm being applied onto the inner collar by means of a bearing piece, which is preferably annular, and preferably has substantially the same diameter as the inner collar, which is applied onto the upper face of the diaphragm in line with the inner collar.

Preferably, the bearing piece consists of an inner cylindrical skirt of a hollow cap whose base constitutes the upper wall of the case and whose side wall engages with slight clearance in the body of the case. The cap and the body of the case thus define, when assembled, the chamber in which the sealing diaphragm is arranged.

Means, such as ribs, may be provided on the opposite walls of the body of the case and of the cap in order to make these elements leaktight.

BRIEF DESCRIPTION OF THE DRAWINGS

In order better to explain the invention, one embodiment will now be described by way of an example which is in no way limiting, with reference to the attached drawings, in which:

FIG. 1 diagrammatically represents, partially in section, a packaging container according to the invention; and, FIG. 2 is an enlarged view of the free end of the tube for filling the container of FIG. 1 with compressed gas.

DESCRIPTION OF PREFERRED EMBODIMENT

The packaging container of aerosol type illustrated in FIG. 1 comprises, as is conventional, a closed casing 1, at the upper end of which a dispensing valve 2 connected to an immersed tube 3 is mounted.

The operating rod 4 of the dispensing valve is actuated by an operating member (not illustrated) provided with a dispensing nozzle.

An adaptor 5 passes through the bottom of the casing 1 in a leaktight manner, the adaptor being provided at its outer end 6 with means for connection to a gas source, in particular a compressed air source.

At the inner end of the adaptor 5, a filling tube 7 is connected which, as is seen in FIG. 1, has a length sufficient to open above the surface 8 of the liquid contained in the container.

At the free end of the filling tube 7, a sealing device given the general reference 9 is mounted, the structure of which is better seen in FIG. 2.

The sealing device 9 illustrated has a general cylindrical shape and comprises a hollow case body 10 divided by a transverse wall 11 provided with through orifices 12.

The wall 11 comprises a cylindrical inner skirt 13 extending upwards on the drawing.

The case body 10 is closed at its upper part by a cap-shaped element 14 provided with an end wall 15 constituting, when assembled, the upper wall of the case, this wall 15 comprising through orifices 16 and being fitted with a cylindrical inner skirt 17.

The cap 14 and the case body 10 are dimensioned such that the cap can be engaged with slight clearance in the upper part of the case body 10, the leaktightness between the two pieces being promoted by the presence of an annular rib 18 at the periphery of the side wall of the cap-shaped element.

In the assembled position, illustrated in FIG. 2, the case body 10 and the cap-shaped element 14 define, when assembled, a chamber 19 delimited at its lower part by the wall 11, at its upper part by the wall 15 and laterally by the side wall of the cap-shaped element 14.

The skirts 13 and 17 mentioned above extend in this chamber 19 respectively from the lower wall 11 and the upper wall 15.

In this chamber 19, there is also arranged a disc-shaped diaphragm 20, made for example of an elastomer material. The diaphragm 20, made in the shape of a disc, having an outer diameter corresponding to the inner diameter of the skirt 13 and resting on the one hand on an outer annular collar 21 projecting upwards from the lower wall 11 and, on the other hand, on an inner annular collar 22 projecting upwards from the lower wall 11 in a central part of the latter.

The orifices 12 of the wall 11 which allow communication between the chamber 19 and the filling tube 7 engaged in the lower tubular part of the case body 10, are arranged around the inner collar 22.

In one embodiment, three orifices 12, of oblong shape, are provided, arranged at equal angles around the inner collar 22.

As is seen in FIG. 2, when assembled, the skirt 17 which has a diameter substantially similar to that of the collar 22 is applied against the upper face of the diaphragm 20, in the central part of the latter. The diaphragm is thus immobilized in its central part by pinching between the skirt 17 and the collar 22.

The immobilization of the diaphragm in its central part ensures that only the peripheral part of the diaphragm is raised when compressed gas is admitted, which results in a controlled and limited deformation of the diaphragm. Stopping of the compressed gas supply leads to the diaphragm 20 returning to its rest position illustrated in FIG. 2, thus reliably closing the orifices 12 and preventing any flow of liquid back through the tube 7.

The diaphragm 20 can be made of any appropriate material and have a planar or slightly domed shaped.

In order to promote the interaction of the diaphragm 20 with the collars 21, 22 and the skirt 17, annular grooves of corresponding diameters may be provided on the upper and lower faces of the diaphragm.

Although the invention has been described in connection with one particular embodiment, it is clear that it is in no way limited thereto, and that different variants and modifications may be made thereto without thereby departing either from the scope or from its spirit of the invention.

We claim:

1. A packaging container of aerosol type, which can be recharged with compressed gas, comprising:
   an outer casing;
   a filling adaptor passing through a wall of the casing in a leaktight manner, the filling adaptor provided at its outer end with means for connection to a compressed gas source;
   a filling tube connected to an inner end of the filling adaptor, a free end of the filling tube opening within an internal volume of the outer casing of the container above the level of a liquid contained in the container;
   a sealing device, mounted at the free end of the filling tube, has the form of a case, the case comprising:
   a base wall;
   an end wall;
   an inner chamber delimited between the base wall and the end wall and having an inner perimeter, the inner chamber communicating with the internal volume of the outer casing through at least one orifice in the end wall and with the filling tube by orifices in the base wall radially outside a central part of the base wall but within the inner perimeter of the inner chamber; and
   an elastic diaphragm seated in the inner chamber, a central part of the elastic diaphragm immobilized against a central part of the base wall.

2. The container according to claim 1, wherein the case further comprises:
   an outer annular collar forming a seat for a peripheral edge of the elastic diaphragm, the outer annular collar forming a part of a wall defining the inner perimeter;
   an inner annular collar extending from the base wall into the inner chamber to form a seat for the central part of the elastic diaphragm; and
   bearing means for bearing onto a face of the elastic diaphragm facing the end wall, the bearing means substantially in line with the inner collar.

3. The container according to claim 2, wherein the bearing means comprises an inner cylindrical skirt of a hollow cap whose base comprises the end wall of the inner chamber, a side wall of the hollow cap is seated with a slight clearance in a body of the case.

4. The container according to claim 2, wherein the orifices made in the base wall are distributed around the inner collar.

5. The container according to claim 1, wherein there is provided in the inner chamber, projecting from the base wall, a cylindrical skirt inside which the elastic diaphragm is arranged.

6. The container according to claim 5, wherein the case is a cylindrical case.

7. The container according to claim 6, wherein elastic diaphragm has the shape of a disc.

8. The container according to claim 1, wherein the wall through which the filling adaptor passes is an end wall.

* * * * *